July 10, 1945.  J. W. HOWLETT  2,380,178
MACHINE FOR CUTTING TUBULAR MEMBERS INTO RINGS
Filed Oct. 7, 1943   4 Sheets—Sheet 1
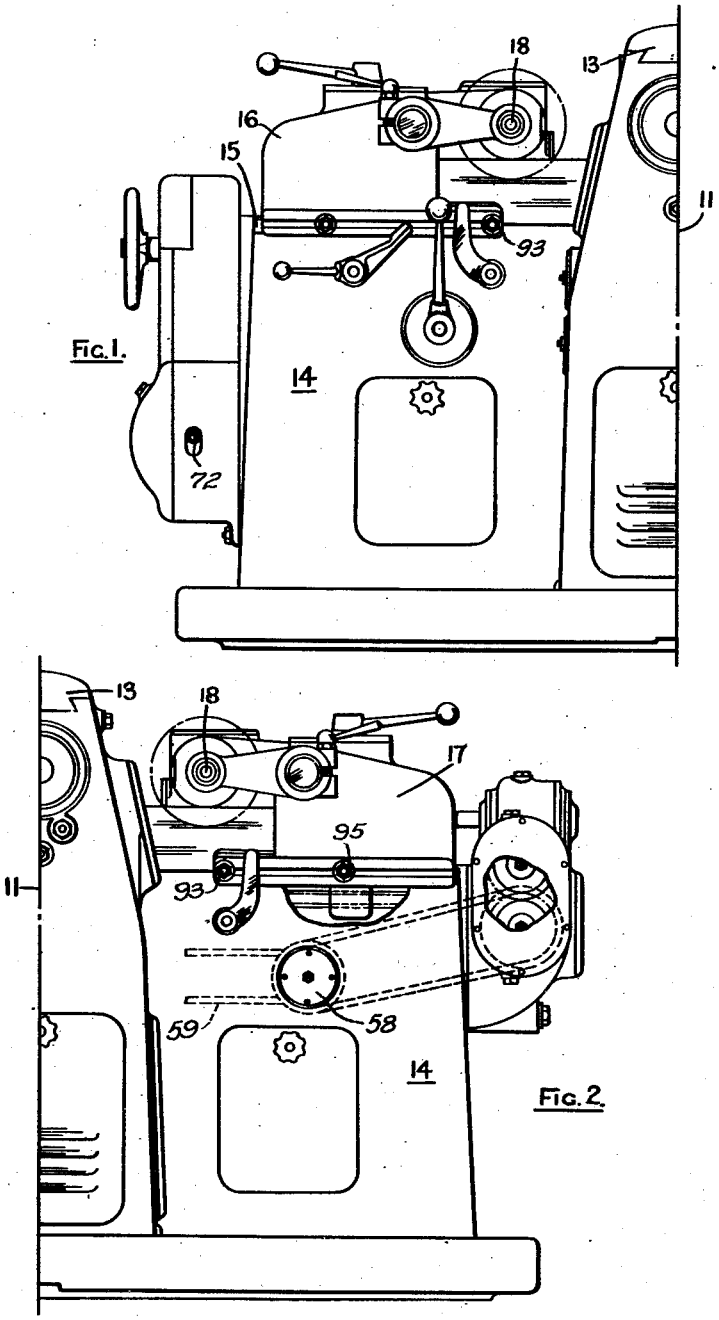
INVENTOR:
JOHN W. HOWLETT Patented July 10, 1945

2,380,178

UNITED STATES PATENT OFFICE 2,380,178

MACHINE FOR CUTTING TUBULAR MEMBERS INTO RINGS

John William Howlett, London, England, assignor to Wellworthy Piston Rings Limited, London, England Application October 7, 1943, Serial No. 505,368
In Great Britain December 22, 1942

3 Claims. (Cl. 29—70)

This invention relates to a machine for forming piston-rings, washers, or other rings, by cutting through a metal pot, cylinder, or other tubular member in planes at rightangles to its axis, of the kind including a rotatable spindle carrying a number of circular saws or other cutters spaced axially from one another dependently upon the width of the rings to be cut, and, parallel thereto, a second rotatable spindle for supporting the tubular member in contact with the cutter.

In the past rings have been formed in this way by hand-feeding, but the intermittent feed motion tends to produce burrs on the finished rings, or other slight irregularities.

It is my main object to avoid this disadvantage.

This and other objects and advantages of the invention will be understood by reference to the following description in connection with the accompanying drawings, wherein:

Figure 1 is a front elevation of the left half of a machine having means for driving the lead screw according to the invention, and Figure 2 is a front elevation of the right half of the machine, the vertical centre line thereof being marked II in the two figures;

According to the invention, a slide supporting the second spindle is operated by a lead screw and nut for feeding purposes, preferably to give a rate of feed of between one-thirty-second and one-eighth of an inch per minute, and a double-acting clutch device is provided for effecting a high-speed return of the slide, or a high-speed travel thereof prior to cutting. Conveniently, the lead screw is driven through a worm gear, for the slow-rate feed, incorporating a drop-out worm which is releasable when the slow-rate feed of the slide is not required, and the double-acting clutch device may be biased to the neutral position and adapted to slip if engaged while the drop-out worm is in mesh with its co-acting worm wheel.

In a convenient arrangement the drive to the drop-out worm is through a pick-off gear pair the driving shaft of which gear pair is fast with a bevel gear meshed with a pair of oppositely-disposed bevel pinions which are respectively clutchable by the clutch device to a shaft connected to the worm wheel. Means should be provided for automatically disconnecting the drop-out worm from the worm wheel when a predetermined inward traverse has been completed, and in a similar manner for automatically disengaging the clutch device at either end of the requisite traverse.

Figure 3:
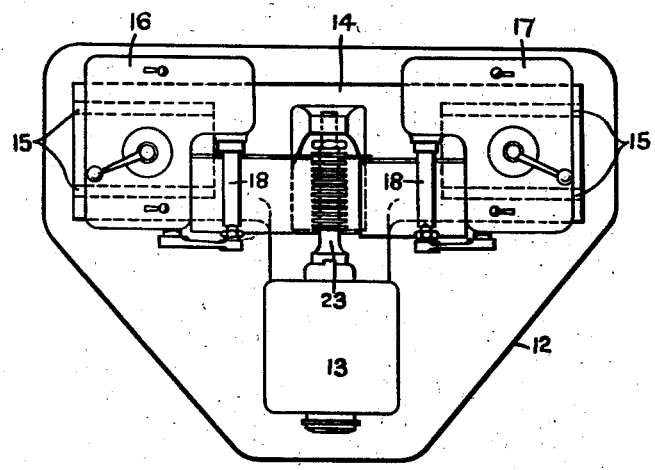
Figure 3 is a plan view of the machine to a smaller scale.

Referring now to the drawings, the machine itself, it will be observed from Figure 3, is in substance shaped like a squat T, excepting for the base plate 12, the machine comprising a headstock 13 in front of a main body 14 which terminates at a lower level than the top of the headstock and is machined to provide aligned ways 15 in a horizontal plane for two slides 16 and 17. The slides are substantially similar, each supporting a spindle 18 adapted to carry one of the tubular members to be cut through. The cutter-carrying spindle 23 is driven from the headstock.

The driving means for these three spindles is preferably as disclosed in the specification accompanying my co-pending patent application Serial No. 505,366 filed October 7, 1943, and the spindles 18 may be supported as disclosed in the specification accompanying my co-pending patent application Serial No. 505,367, filed October 7, 1943, now Patent No. 2,365,760, issued December 26, 1944.

Figure 6:
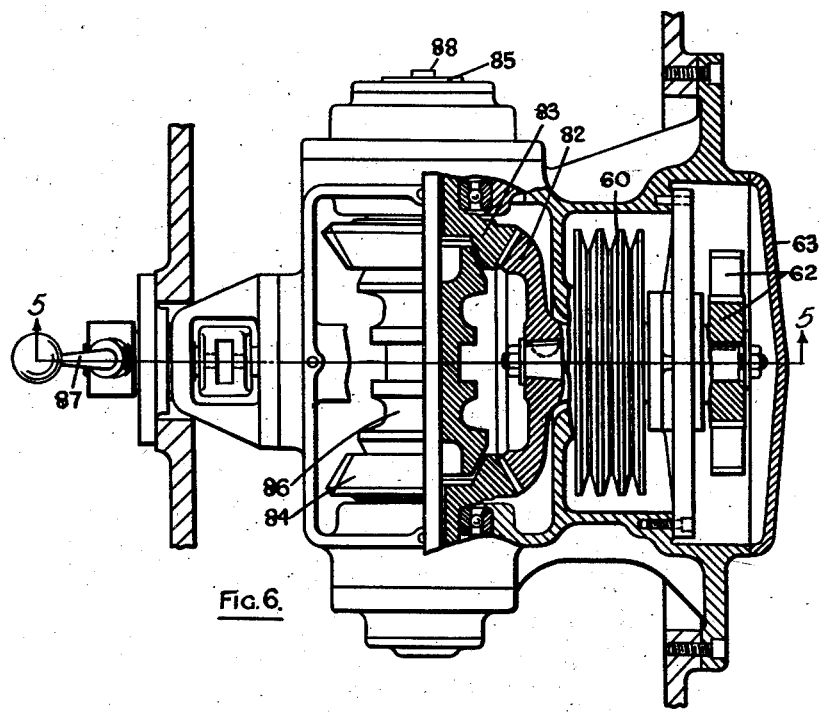
Figure 6 is a sectional plan taken on the lines 6—6 of Figure 5.
Figure 4:
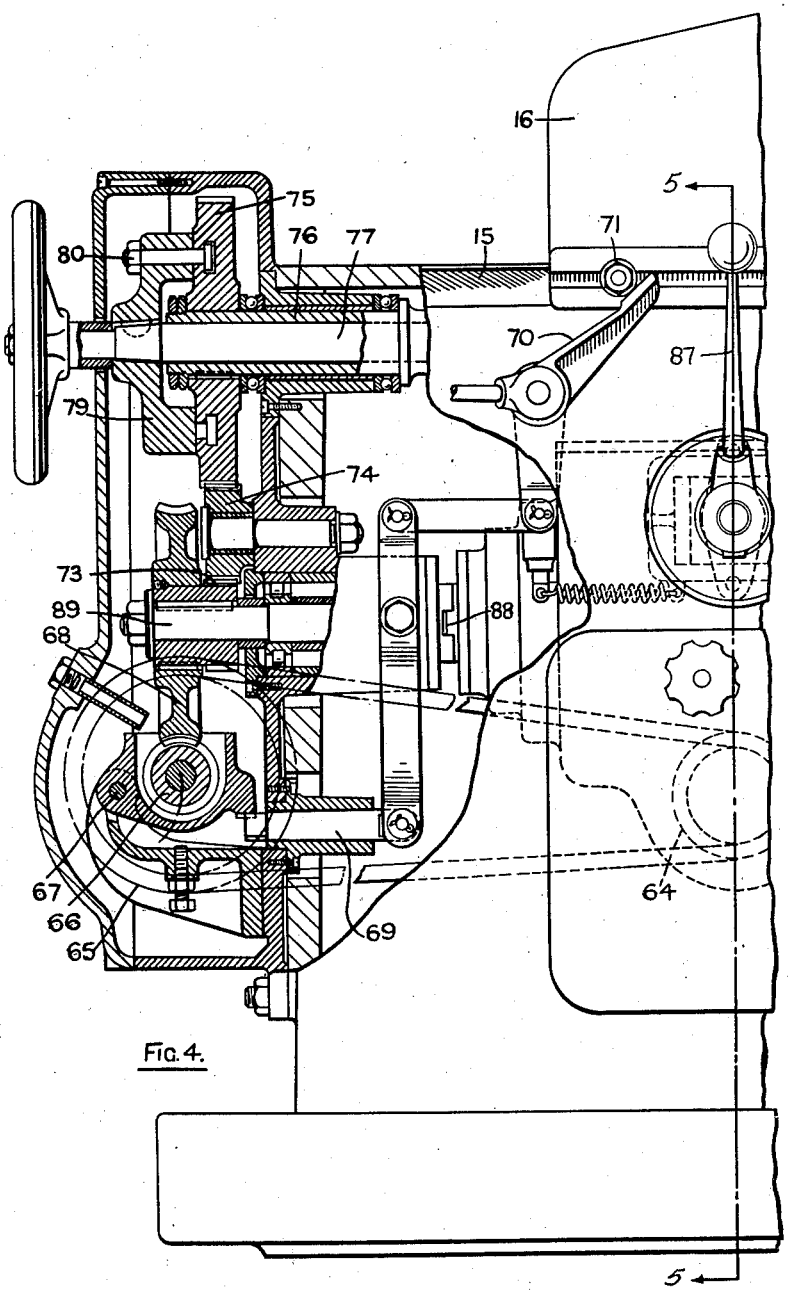
Figure 4 is a front sectional elevation of the left-hand end of the machine to a larger scale.
Figure 5:
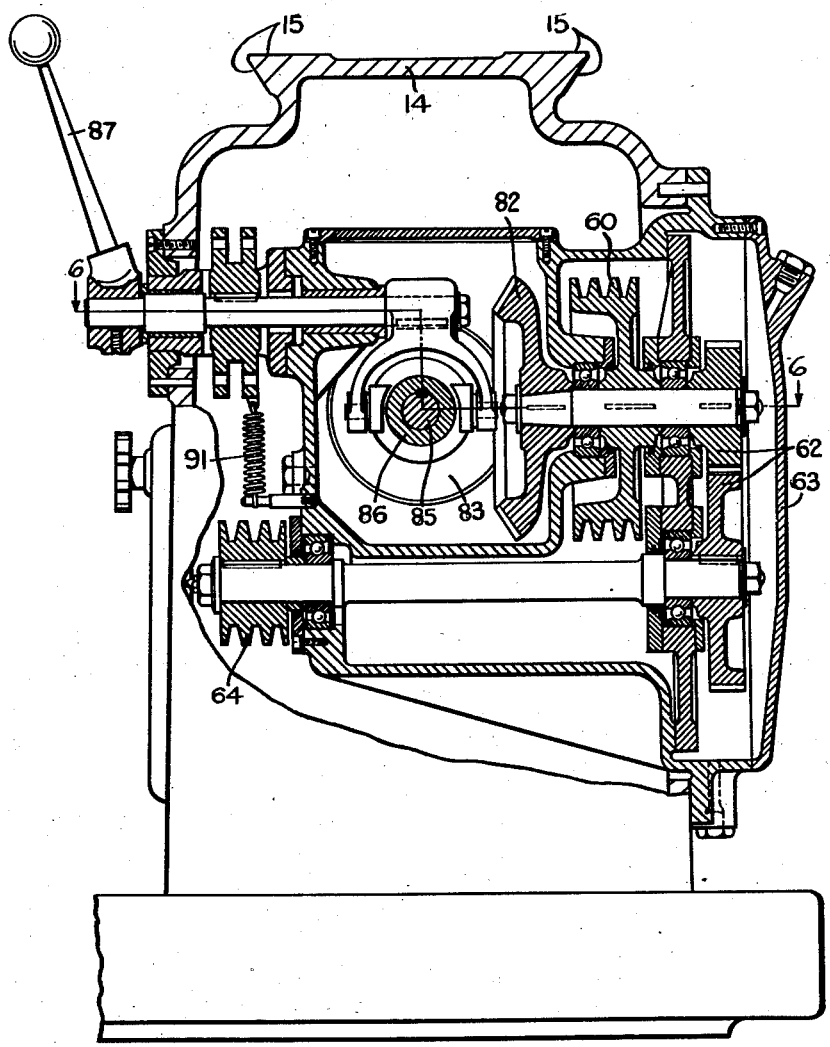
Figure 5 is a cross-section taken on the lines 5—5 of Figures 4 and 6.

In the right-hand side (Figure 2) of the machine is disposed the driving motor, not shown, for the spindles 18, the motor driving to a pulley-shaft supported by the boss 58. The pulley shaft drives by a belt 59 across the machine to a pulley 60 (Figures 5 and 6) in the left-hand half of the machine, the pulley 60 driving through a vertically-arranged pick-off gear pair 62 (accessible upon removal of the cover 63, which is at the back of the machine) to a pulley 64, which in turn drives by belt to a pulley 65 (Figure 4) on a worm shaft 66 of a drop-out worm box pivotally mounted at 67. The worm box can be held with the worm in mesh with a worm wheel 68 by means of a catch 69 which can be released by a stop arm 70, the latter being manually operable or automatically operable in a well-understood manner when engaged by an adjustable abutment 71 on the slide 16. The worm box can be raised by means of the handle 72 (Figure 1).

Fast with the worm wheel 68 is a gear 73 which meshes through an idler 74 with a gear 75 fast on a hollow lead screw 76 for the slide 16. Extending through the hollow lead screw 76 is a lead screw 77 for the slide 17, Figure 2 showing it engaged with a nut 78 fast with the slide 17 and extending through a cored hole in the base 14. The lead screw 77 has fast on it a disc 79 which is adjustably coupled to the gear 75, the coupling means in the present instance being shown as comprising T-headed bolts 80 engaged in an undercut groove provided in the gear 75. Thus, in ordinary conditions, the two lead screws are driven in unison when the worm box is raised for automatic feeding purposes.

Referring again to Figures 5 and 6, the pulley 60 is fast with a bevel gear 82 which is permanently meshed with oppositely-disposed bevel pinions 83 and 84 free on a shaft 85 and selectively clutchable thereto by a double-acting one-faced member 86 operable by a handle 87. The shaft 85 is formed with dogs 88 (Figures 4 and 6) which engage with corresponding dogs on a shaft 89 upon which the worm wheel 68 and gear 73 are fast. Thus, when the worm box has been lowered, operation of the handle 87 in one or the other direction introduces a quick traverse movement of the slides 16, 17 through the lead screws.

The handle 87 is conveniently biassed to a neutral position as by means of a spring 91 so that it must be held in an engaged position when the quick traverse drive is required. The double-acting clutching member 86 is preferably designed so that it can slip if the handle 87 should be moved in an engaging direction while the worm box is raised.

In order to prevent the slides when being returned by the quick traverse drive from overrunning the ends of the ways, I provide each of them with an adjustable abutment 93, the latter coacting in a known manner with arms 94 on the right and left-hand sides of the machine and interconnected with one another and with the handle 87 such as to ensure the return of the latter to the neutral position when a quick traverse in the return direction has been effected. In like manner further abutments may be provided on the slides to coact with the arms 94 and ensure a disconnection of the quick traverse drive in the forward direction before the tubular members are brought into engagement with the cutters. One such abutment is indicated at 95 in Figure 2.

What I claim as my invention and desire to secure by Letters Patent of the United States is:

1. A machine for cutting a metal tubular member into rings, including a rotatable spindle, axially-spaced circular cutters carried by said spindle, and, parallel thereto, a second rotatable spindle, for supporting the tubular member, a slide supporting said second spindle, said slide operated by a lead screw and nut for feeding purposes, a gear for said lead screw, a double-acting clutch device for effecting through said lead screw gear a high-speed return of said slide or a high-speed forward travel thereof prior to cutting, a worm gear for driving said lead screw gear for the slow-rate feed, said worm gear incorporating a drop-out worm releasable when the high-speed motion of said slide is required, said clutch device and said worm being driven from a common driving means respectively through a bevel gear and a pair of oppositely disposed bevel pinions on the one hand and through a pick-off gear pair on the other hand, and means biasing said double-acting clutch device to the neutral position, said device being adapted to slip if engaged while said drop-out worm is in mesh with its coacting worm wheel.

2. A machine-tool incorporating a slide, a lead screw and nut for operating said slide, a gear fast with said lead screw, a double-acting clutch device for driving said lead screw gear to effect a high-speed motion of said slide in either direction, and a worm gearing for driving said lead screw gear for effecting a slow rate feed of said slide, said worm gearing incorporating a drop-out worm releasable when the high-speed motion of said slide is required, said clutch device and said worm gearing being driven from a common driving means respectively through a bevel gear and a pair of oppositely-disposed bevel pinions on the one hand and through a pick-off gear pair on the other hand.

3. A machine-tool incorporating a slide, a lead screw and nut for operating said slide, a gear fast with said lead screw, a double-acting clutch device for driving said lead screw gear to effect a high-speed motion of said slide in either direction, a worm gearing for driving said lead screw gear to effect a slow rate feed of said slide, said worm gearing incorporating a drop-out worm releasable when the high-speed motion of said slide is required, and means for automatically releasing said drop-out worm when a predetermined movement of the slide has been effected, said clutch device and said worm gearing being driven from a common driving means respectively through a bevel gear and a pair of oppositely-disposed bevel pinions on the one hand and through a pick-off gear pair on the other hand.

JOHN WILLIAM HOWLETT.